United States Patent
Bonanno et al.

(10) Patent No.: US 9,424,044 B1
(45) Date of Patent: Aug. 23, 2016

(54) SILENT MODE AND RESOURCE REASSIGNMENT IN BRANCH PREDICTION LOGIC FOR BRANCH INSTRUCTIONS WITHIN A MILLICODE ROUTINE

(71) Applicant: International Business Machines Corporation, Armonk, NY (US)

(72) Inventors: James J. Bonanno, Wappingers Falls, NY (US); Adam B. Collura, Hopewell Junction, NY (US); Daniel Lipetz, Flushing, NY (US); Brian R. Prasky, Campbell Hall, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/061,229

(22) Filed: Mar. 4, 2016

Related U.S. Application Data

(63) Continuation of application No. 14/848,498, filed on Sep. 9, 2015.

(51) Int. Cl.
*G06F 9/38* (2006.01)
(52) U.S. Cl.
CPC .................... *G06F 9/3806* (2013.01)
(58) Field of Classification Search
None
See application file for complete search history.

(56) References Cited

U.S. PATENT DOCUMENTS

| | | | | |
|---|---|---|---|---|
| 5,634,119 | A * | 5/1997 | Emma | G06F 9/3017 712/200 |
| 6,125,444 | A * | 9/2000 | Check | G06F 9/3844 712/227 |
| 7,673,122 | B1 * | 3/2010 | Song | G06F 9/3846 712/239 |
| 7,913,068 | B2 | 3/2011 | Bonanno et al. | |
| 9,086,886 | B2 | 7/2015 | Prasky et al. | |
| 2005/0216713 | A1 * | 9/2005 | Prasky | G06F 9/30145 712/238 |
| 2010/0037038 | A1 * | 2/2010 | Bieswanger | G06F 1/3203 712/220 |
| 2014/0229721 | A1 | 8/2014 | Forsyth et al. | |

* cited by examiner

*Primary Examiner* — Jacob A Petranek
(74) *Attorney, Agent, or Firm* — Cantor Colburn LLP; Margaret McNamara

(57) ABSTRACT

A method, system, and computer program product of utilizing branch prediction logic in a system that processes instructions that include a branch are described. The method includes identifying the branch as conventionally predictable or not conventionally predictable, and based on the branch being identified as not conventionally predictable according to the identifying, either foregoing branch prediction and reallocating, using a processor, the branch prediction logic to another thread of the instructions or performing, using the processor, the branch prediction and speculative execution of one or more of the instructions following the branch to obtain prediction information. Based on the performing the branch prediction and the speculative execution, the method also includes verifying a match between a branch end according to the instructions and a branch end according to the branch prediction prior to providing the prediction information to a second processor processing the instructions.

1 Claim, 2 Drawing Sheets

US 9,424,044 B1

SILENT MODE AND RESOURCE REASSIGNMENT IN BRANCH PREDICTION LOGIC FOR BRANCH INSTRUCTIONS WITHIN A MILLICODE ROUTINE

This application is a continuation of U.S. application Ser. No. 14/848,498 filed Sep. 9, 2015, the disclosure of which is incorporated by reference herein in its entirety.

BACKGROUND

The present invention relates to branch prediction logic (BPL), and more specifically, to silent mode and resource reassignment in BPL.

In a computing system such as a microprocessor, branch instructions are used to implement control flow constructs such as conditionals or loops. When the branch that will be taken can be predicted, it facilitates a prefetch of parameters and a speculative execution of instructions subsequent to the branch instructions. When the actual branch resolution (branch direction and target) is equal to the predicted branch direction and target, this prefetch and speculative processing can increase speed and efficiency.

SUMMARY

Embodiments include a method, system, and computer program product of utilizing branch prediction logic in a system that processes instructions that include a branch. The method includes identifying the branch as conventionally predictable or not conventionally predictable, and based on the branch being identified as not conventionally predictable according to the identifying, either foregoing branch prediction and reallocating, using a processor, the branch prediction logic to another thread of the instructions or performing, using the processor, the branch prediction and speculative execution of one or more of the instructions following the branch to obtain prediction information. Based on the performing the branch prediction and the speculative execution, the method also includes verifying a match between a branch end according to the instructions and a branch end according to the branch prediction prior to providing the prediction information to a second processor processing the instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, branch prediction is used to prefetch and speculatively execute instructions. A branch referred to herein as "conventionally predictable," for explanatory purposes only, may be predicted and efficiency gains based on the speculative execution may be realized. Certain other types of instructions may represent branches that are not allowed to be predicted by design (ineligible branches) or are badly behaved branches (difficult to predict branches) that are not conducive to speculative execution. These may be referred to, for explanatory purposes only, as "not conventionally predictable." For example, a millicoded routine is entered via a "millicode entry" (mcentry) instruction and exited by a "millicode end" (mcend) instruction, and sometimes an mcend is marked (by the compiler) as not being eligible to be predicted. Branches that are non-deterministic based on prior outcomes are another example of instructions that may be considered unsuited for branch prediction or "not conventionally predictable." The reason to distinguish conventionally predictably and not conventionally predictable branches is because an incorrect prediction is not without cost. While there are speed and efficiency advantages to correctly predicting and speculatively executing a branch and subsequent instructions, there is a cost in performance for the processor that is associated with instruction-cache prefetch, table updates and other functions that are ultimately unused or incorrect due to an incorrect prediction. Embodiments of the systems and methods detailed herein relate to reducing the cost of an incorrect prediction while reaping the benefits for a correct prediction or enjoying efficiency gains even without prediction. Specifically, a silent mode within branch prediction logic allows predictions (of not conventionally predictable branches) to be verified prior to involving the processor in any tasks (e.g., prefetch, table update) that may degrade performance if undertaken unnecessarily. Also, reassignment of resources that would be used for prediction (of not conventionally predictable branches) when it is determined that prediction is not prudent allows efficiency gains even without the prediction. The decision of which action to take for a not conventionally predictable branch may be reached in different ways, as detailed below.

Figure 1:
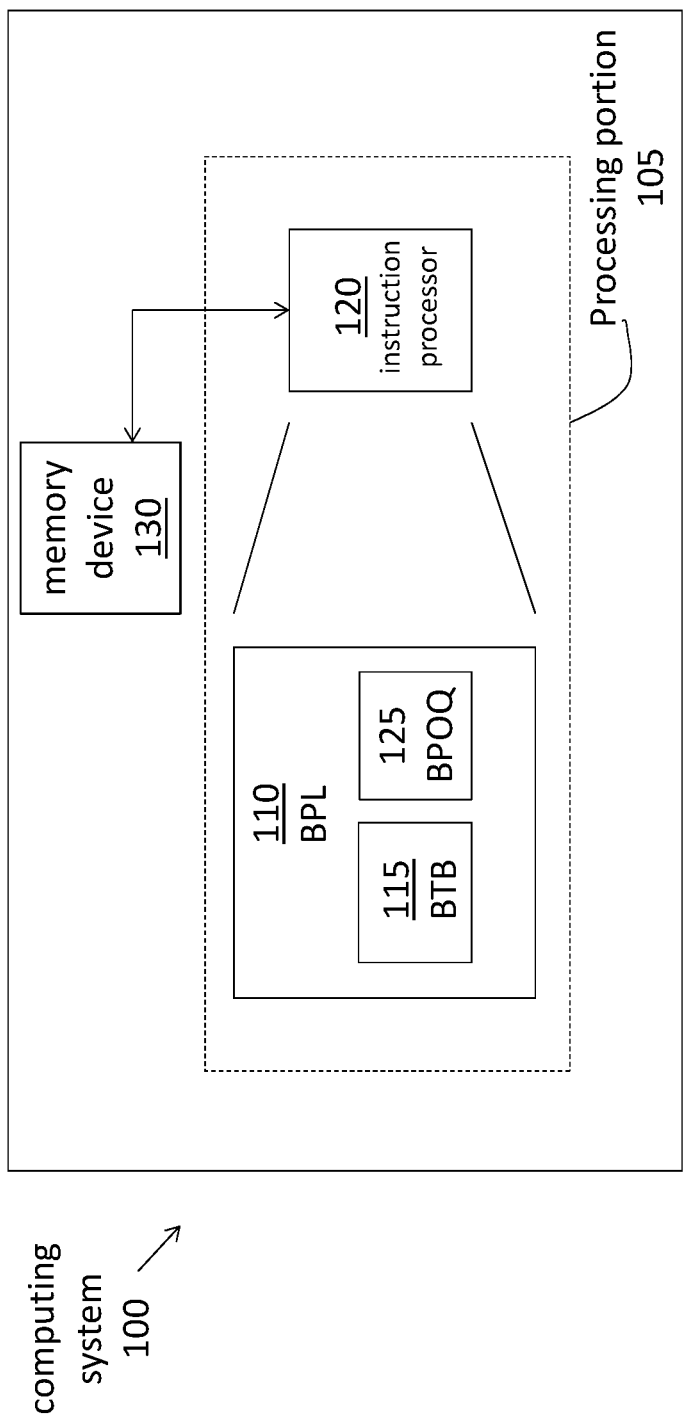
FIG. 1 is a block diagram of a computing system employing branch prediction logic according to embodiments.

FIG. 1 is a block diagram of a computing system 100 employing branch prediction logic according to embodiments. The system 100 includes a processing portion 105 with one or more processors 120 that process instructions stored in one or more memory devices 130. These instructions may include branches. The branch prediction logic (BPL) 110, which is shown within the processing portion 105 in FIG. 1, may be implemented by one or more processors 120 that are dedicated to branch prediction or shared with other processing tasks. The BPL 110 accesses one or more branch target buffers (BTBs) 115 which store branch-related information. When a set of instructions is executed by the processor 120 for the first time, the BPL 110 stores branch-related information in the BTB 115. Then, for subsequent executions of the same set of instructions by the processor 120, the BPL 110 can search the BTB 115 at address spaces not yet reached by the processor 120 as part of the branch prediction process. The branch prediction output queue (BPOQ) 125 is the interface between the BTB 115 and processing outside the BPL 110 (processing by a processor 120 that does not implement the BPL 110, for example). The BPOQ 125 provides information including speculative information predicted by the BPL 110. When the system 100 compiler creates the code (instructions) that will be implemented by the processor 120, the compiler may include markers for not conventionally predictable branches (ineligible branches and other difficult to predict (badly behaved) code). Alternately, the BPL 110 may identify not conventionally predictable branches based on metrics, for example (i.e., the BPL 110 may track that prediction was incorrect for a given branch over a predefined number of the previous executions). Aspects of the BPL 110 and operation according to embodiments that include the silent mode or resource sharing is discussed below.

Figure 2:
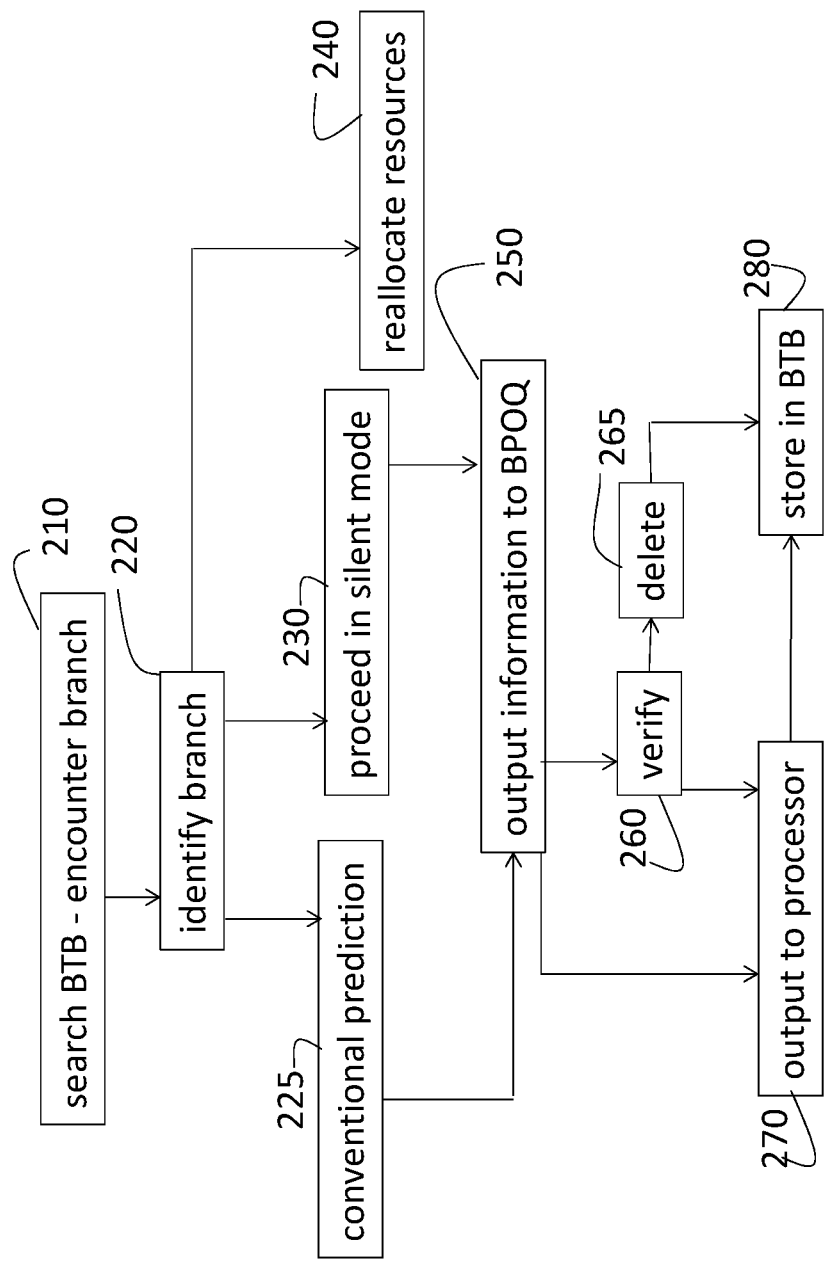
FIG. 2 is a process flow of a method of utilizing branch prediction logic according to embodiments.

FIG. 2 is a process flow of a method of utilizing branch prediction logic according to embodiments. The flow shown in FIG. 2 may be reached in different ways. For example, the system 100 may boot up and run the program provided by the compiler for the first time. As another example, the system 100 may have run the program previously such that branch information is already stored in the BTB 115. The BPL 110 is executed ahead of the processor 120 that is executing the program instructions. That is, the BPL 110 searches address spaces in the BTB 115 that are ahead of the address spaces currently being executed by the processor 120. Accordingly, branch prediction information (e.g. speculative execution results) may be provided to the processor 120 before the processor 120 reaches the instructions that were speculatively executed by the BPL 110. If the BPL 110 and processor 120 were simultaneously reaching the same portion of the instruction, any speed and efficiency increases derived from branch prediction would be reduced. That is, the processor 120 fetches instructions from cache, decodes the instructions, and then executes the instructions. In the decode stage, the processor 120 can use information from the BPL 110 via the BPOQ 125 to prefetch data and obtain other information needed in the execution stage. However, the information from the BPL 110 is most helpful when it is available before execution begins.

At block 210, the processes include searching the BTB 115 and encountering a branch. As noted above, a branch would only be encountered in the BTB 115 if the set of instructions had previously been executed by the processor 120. If the processor 120 is executing the set of instructions for the first time, no branches would be encountered in the BTB 115. Also, if the processor 120 is executing a branch that was not previously predicted, as further discussed below, the branch may not be encountered in the BTB 115. At block 220, the processes include identifying a branch as conventionally predictable or not conventionally predictable. If the branch is a conventionally predictable branch, then conventional branch prediction proceeds, at block 225, in a known manner that is not further detailed herein. Identification of a branch as not conventionally predictable may be done in different ways. The identification may be based on a marker placed by the compiler. The compiler may identify certain millicode or other unpredictable code with the marker. For example, when a millicode routine is clearing out some structure, the routine may need to guarantee that the structure is cleared. As a result, speculative execution may corrupt the BTB 115. In this case, the compiler labeling the millicode routine as ineligible for prediction and, thereby, not allowing the branch prediction to predict the mcend instruction that exits the milliconde routine effectively ends prediction until the mcend completes. In some cases, the BPL 110 itself may identify a not conventionally predictable branch based on metrics that indicate that the branch was incorrectly predicted a predetermined number of times previously (thus, making future predictions futile).

Whether a marker (by the compiler) or the BPL 110 characterizes the branch as not conventionally predictable, one of two processes is implemented according to embodiments detailed herein, as shown in FIG. 2. Which of the two processes is implemented may be determined based on predefined configuration settings. Alternately, user specification may be used on a per-branch basis or as a general rule for all not conventionally predictable branches. As another example, when the compiler encodes information in association with a given branch, the encoded information may specify which of the two processes is to be implemented. The embodiments detailed herein are not limited based on how one of the two processes (at blocks 230 and 240) is selected for implementation. One of the processes, at block 230, is proceeding in silent mode and is further detailed below. In this mode, predictions are made by the BPL 110 but no branch information is communicated from the BPL 110 via the BPOQ 125 to the processor 120 until verification is completed (block 260). The verification is further discussed below. The second process that may be implemented when a not conventionally predictable branch is encountered is immediately shutting down branch prediction and reallocating resources to another thread at block 240 when in simultaneous multi-threaded operation. This option trades efficiencies. That is, rather than wasting resources on a branch in a given thread that has been determined not to benefit from prediction, the resources are instead used to aid in other functions of the system 100, such as the BPL 110 searching for branches in other threads (block 210), for example.

Whether proceeding in silent mode (per block 230) or doing conventional branch prediction for a conventionally predictable branch (per block 225), outputting information to the BPOQ 125, at block 250, includes outputting branch prediction information, which includes information resulting from speculative execution. In the case of conventional prediction (block 225), the information in the BPOQ 125 is output to the processor 120 at block 270. In the case of silent mode prediction (block 230), the information in the BPOQ 125 is first verified at block 260. Verifying, at block 260, includes determining if the branch resolution predicted by the BPL 110 (regarding the branch being taken and the correct target being reached or the branch not being taken) matches the actual resolution. In this case, the predictions made while in silent mode are output from the BPOQ 125 to the processor 120 at block 270. On the other hand, if the verification process (at block 260) indicates that the predictions made in silent mode were wrong, the predictions are deleted (at block 265). Further, the decoding logic (in the processor 120) is informed that the BPL 110 searched that address space and found no branches. This information is necessary for the processor 120 to proceed. At block 280, storing information in the BTB 115 includes adding branch information to the BTB 115 (e.g., when the set of instructions is executed the first time) or updating previously stored information in the BTB 115 based on the actual execution by the processor 120. Information may be stored in the BTB 115 even when the branch is not predicted (reallocating at block 240 is selected) or is predicted incorrectly (whether by conventional prediction (at block 225), as determined by verification of the processing outcome, or in silent mode (at block 230), as determined by the verification at block 260). Storing information about an incorrect prediction (whether done conventionally or in silent mode) facilitates identifying the branch as not conventionally predictable (at block 220) during a subsequent execution (e.g., based on metrics reviewed by the BPL 110). The information may also be used to determine whether to select proceeding in silent mode (block 230) or reallocating resources (block 240) in a subsequent execution (e.g., reallocate resources because silent mode prediction has been incorrect for more than a predefined number of times).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to process instructions that include a branch instruction, the method comprising:

determining, using a processor, whether or not the branch instruction is contained in a millicode routine, the determining being based on a marker generated by a compiler of the instructions;

implementing, using the processor, branch prediction logic to obtain prediction information based on the branch instruction contained in the millicode routine and execution logic to execute instructions, the implementing the branch prediction logic including accessing a branch target buffer storing information obtained from previous execution of the branch;

determining, prior to providing the prediction information to a second processor that processes the instructions, whether or not a branch end according to the instructions matches a predicted branch end according to the branch prediction, using the processor, based on the implementing the branch prediction logic and the execution logic;

providing, using the processor, the prediction information to the second processor based on the branch end matching the predicted branch end and not providing the prediction information to the second processor based on the branch end not matching the predicted branch end; and prefetching, using the second processor, data in accordance with the prediction information based on the processor providing the prediction information to the second processor.

* * * * *